United States Patent
Numazaki

[11] Patent Number: 5,990,893
[45] Date of Patent: Nov. 23, 1999

[54] DATA INPUT DEVICE AND METHOD

[75] Inventor: Shunichi Numazaki, Yokohama, Japan

[73] Assignee: Kabushiki Kaisha Toshiba, Kawasaki, Japan

[21] Appl. No.: 08/928,140

[22] Filed: Sep. 12, 1997

[30]     Foreign Application Priority Data

Sep. 13, 1996 [JP] Japan ................................. 8-243869

[51] Int. Cl.⁶ .............................. G06F 3/00; G06K 9/68
[52] U.S. Cl. ......................... 345/358; 345/339; 345/145; 382/189
[58] Field of Search .................... 345/145, 179, 345/339, 358, 434; 382/187–189, 202

[56]              References Cited

U.S. PATENT DOCUMENTS

| 5,590,219 | 12/1996 | Gourdol .................... | 382/202 |
| 5,592,566 | 1/1997 | Papagallo et al. .......... | 382/187 |
| 5,594,810 | 1/1997 | Gourdol .................... | 382/187 |
| 5,687,254 | 11/1997 | Poon et al. ................ | 382/229 |
| 5,710,832 | 1/1998 | Berman et al. ............. | 382/189 |
| 5,809,267 | 12/1993 | Moran et al. .............. | 345/358 |

FOREIGN PATENT DOCUMENTS 8-44490   2/1996   Japan .

OTHER PUBLICATIONS

Masaaki Fukumoto, et al., 7ᵗʰ Symposium on Human Interface, pp. 427–432, "Hand Reader by Image Sequence Processing", Oct. 23–25, 1991 (English Abstract only).

Nikkei Electronics, No. 525, pp. 115–133, Apr. 15, 1991 (No translation provided).

*Primary Examiner*—Raymond J. Bayerl
*Assistant Examiner*—X. L. Bautista
*Attorney, Agent, or Firm*—Oblon, Spivak, McClelland, Maier & Neustadt, P.C.

[57]              ABSTRACT

An object displayed in a picture can be designated by the operator, without use of any additional device for inputting data other than position data. Position data of a pointer for designating any desired position in a picture are inputted by a pointer position input section (1). On the basis of the input data, a change of the pointer position relative to a specific region (13) set in relation to an object (12) in the picture is detected by a pointer region pass detecting section (2). On the basis of the output of the pointer region pass detecting section (2), the pointer positions obtained by the pointer position inputting section (1) are accumulated by a pointer position accumulating section (3). Further, the pointer locus data obtained by the pointer position accumulating section (3) are recognized by a gesture recognizing section (4) to detect a significant movement (a specific input operation) of the pointer in a specific region. The detected significant movement of the pointer is applied to a processing section (5) to receive the significant input operation corresponding to the significant movement of the pointer other than the position data.

19 Claims, 10 Drawing Sheets

KINDS OF PASS

| DIR. I:OUTSIDE→INSIDE<br>O:INSIDE→OUTSIDE | EDGE T(TOP) B(BOTTOM)<br>L(LEFT) R(RIGHT) |
|---|---|
| I | T |
|  | B |
|  | L |
|  | R |
| O | T |
|  | B |
|  | L |
|  | R |

DATA INPUT DEVICE AND METHOD

BACKGROUND OF THE INVENTION

1. Field of the Invention

The present invention relates to a data input device and method, and more specifically to a data input device for controlling a pointer operation in a data displaying picture to operate an electronic apparatus such as a personal computer.

2. Description of the Prior Art

Conventionally, when an electronic apparatus such as a personal computer is operated, a pointer or a cursor displayed on a data displaying picture is moved by use of a pointing device such as mouse, track ball, etc. Further, an object displayed on the picture is pointed by the pointer, and then a button is additionally operated to start a specific work or to move an object. The method as described above is referred to a GUI (graphical user interface), which is widely used as a method of operating a personal computer.

However, since the electronic apparatus has been small-sized more and more so as to be portable, in the future it is easily predicted that the conventional pointing device is not usable satisfactorily. For instance, when a mouse is used, since a place having a certain area is required, the mouse is not suitable for a portable electronic apparatus. On the other hand, in the case of a track ball or a small-sized joy stick, since the movement of the operator's hand differs from the movement of the pointer, these devices are not suitable when a gesture for designating a specific work is inputted. Further, when a pen device is used, since the pen must be taken out whenever used and thereby there exists a possibility of loss of the pen, the pen cannot be considered as the best method.

Now, as the data input method, Japanese Patent Application No. 7-250418 filled by the same Inventors discloses a finger pointing interface (FPI) such that light is allowed to be incident upon the operator's hand; the light reflected from the hand is detected as an image; and the pointer position is obtained by processing the image data. In this method, since the pointer movement can be controlled on the basis of the movement of the finger's motion; that is, since a part of the operator's body can be detected without use of any specific tool, when a pointer is operated as described above to input data to an electronic apparatus, there exists such a merit that the operability can be improved markedly in particular in the case of the portable data electronic apparatus.

In the case of the FPI, however, when a picture is operated, since the pointer is not operated on the basis of only the finger motion, but since the pointer operation is decided in combination with the button switch, there exists a limit of improvement of the operability. In other words, when the portable data apparatus is supported by the left hand and further the pointer is moved by the right hand, for instance, since the button must be depressed by the left hand at the same time, there exists a problem in that when the button is depressed by the left hand, the apparatus body is moved, so that a desired object on a picture cannot be pointed or whenever the button is depressed, the picture is moved, thus causing a problem in that the pointing operation is not easy.

On the other hand, in the case of the pointing device, although the position data can be inputted on the basis of contact or non-contact with a tablet, in order to add a specific operation other than positional data, it is necessary to provide a switch attached at top of the pen so as to be turned on when the pen is pushed against the tablet, or to dispose another switch in the pen body, so that there exists a problem in that it is difficult to improve the operability thereof decisively.

The same problem as above is prominent when a spacial mouse is used (in which the pointer is moved by a remote controller having a gyroscope or an infrared light emitting section). That is, when a significant operation is added to an object pointed by the pointer, since an additional operation parts such as another button or switch is inevitably needed, this causes a factor which obstructs an improvement of the operability of the electronic apparatus.

As described above, in the prior art data input device, as the means for inputting a specific operation other than the position data, since the mouse button or an inputting section corresponding to the mouse button is provided. In addition, since the button operation and the position data are both processed in connection with each other, there exists a problem in that the operation is complicated, in particular in the case of the portable data apparatus, with the result that the data input device is not suitable according to the sort of operation.

SUMMARY OF THE INVENTION

With these problems in mind, therefore, it is the object of the present invention to provide a data input device and method, which can point an object displayed on a picture, can input an operation related thereto, and can realize a comfortable operation for an electronic apparatus, without use of any operating section for inputting data other than the position data. In this data input device according to the present invention, a function for discriminating a gesture input on the basis of change in position data to designate a specific operation is simply added to the function for inputting the position data.

To achieve the above-mentioned object, the present invention provides a data inputting device, comprising: pointer position inputting means for causing a computer to input position data of a pointer displayed on a picture; pointer position accumulating means for causing a computer to accumulate the pointer position data applied by said pointer position inputting means; gesture recognizing means for causing a computer to discriminate whether a pointer locus represented by the pointer position data applied by said pointer position accumulating means is a predetermined gesture or not; and a processing section for causing a computer to execute an operation related to an object in association with the pointer locus, whenever said gesture recognizing means recognizes the pointer locus as a predetermined gesture.

Further, the present invention provides a data inputting device, comprising: pointer position inputting means for causing a computer to input position data of a pointer displayed on a picture; edge pass detecting means for causing a computer to detect a direction or directions in which the pointer passes across one or a plurality of boundary edge lines displayed on the picture; time series pattern analyzing means for causing a computer to obtain a command by analyzing one or a plurality of signals applied by said edge pass detecting means in time series manner; and a processing section for causing a computer to execute an operation according to the command obtained by said time series pattern analyzing means.

Further, the present invention provides a method of inputting data, comprising the steps of: causing a computer to input position data of a pointer displayed on a picture, by use of pointer position inputting means; causing a computer to accumulate the pointer position data applied by the pointer position inputting means, by use of pointer position accumulating means; causing a computer to discriminate whether a pointer locus represented by the pointer position data applied by the pointer position accumulating means is a predetermined gesture or not, by use of gesture recognizing means; and causing a computer to execute an operation related to an object in association with the pointer locus, whenever the gesture recognizing means recognizes the pointer locus as a predetermined gesture, by use of a processing section.

Further, the present invention provides a method of inputting data, comprising the steps of: causing a computer to input position data of a pointer displayed on a picture, by use of pointer position inputting means; causing a computer to detect a direction or directions in which the pointer passes across one or a plurality of boundary edge lines displayed on the picture, by use of edge pass detecting means; causing a computer to obtain a command by analyzing one or a plurality of signals applied by the edge pass detecting means in time series manner, by use of time series pattern analyzing means; and causing a computer to execute an operation according to the command obtained by the time series pattern analyzing means, by use of a processing section.

Further, the present invention provides a computer-readable memory, comprising: pointer position inputting means for causing a computer to input position data of a pointer displayed on a picture; pointer position accumulating means for causing a computer to accumulate the pointer position data applied by said pointer position inputting means; gesture recognizing means for causing a computer to discriminate whether a pointer locus represented by the pointer position data applied by said pointer position accumulating means is a predetermined gesture or not; and a processing section for causing a computer to execute an operation related to an object in association with the pointer locus, whenever said gesture recognizing means recognizes the pointer locus as a predetermined gesture.

Further, the present invention provides a computer-readable memory, comprising: pointer position inputting means for causing a computer to input position data of a pointer displayed on a picture; edge pass detecting means for causing a computer to detect a direction or directions in which the pointer passes across one or a plurality of boundary edge lines displayed on the picture; time series pattern analyzing means for causing a computer to obtain a command by analyzing one or a plurality of signals applied by said edge pass detecting means in time series manner; and a processing section for causing a computer to execute an operation according to the command obtained by said time series pattern analyzing means.

BRIEF DESCRIPTION OF THE DRAWINGS

FIGS. 7(A) to 7(C) are illustrations for assistance in explaining an example to which the second embodiment shown in FIG. 3 is applied to a slider operation.

DETAILED DESCRIPTION OF THE PREFERRED EMBODIMENTS

The embodiments of the data input device and method according to the present invention will be described hereinbelow with reference to the attached drawings.

Figure 1:
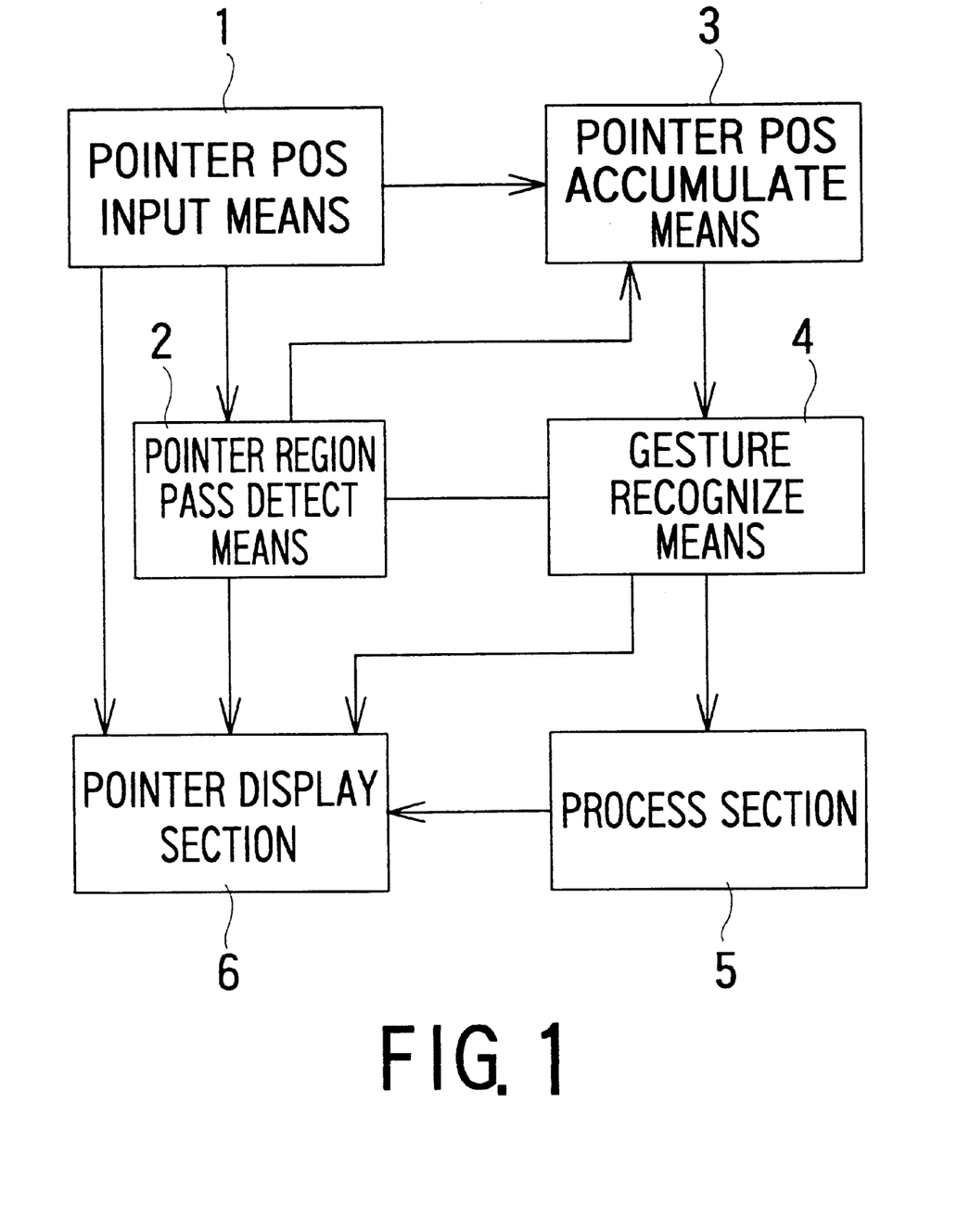
FIG. 1 is a block diagram showing a first embodiment of the data input device according to the present invention.

FIG. 1 is a block diagram showing the first embodiment thereof.

Figure 1A:
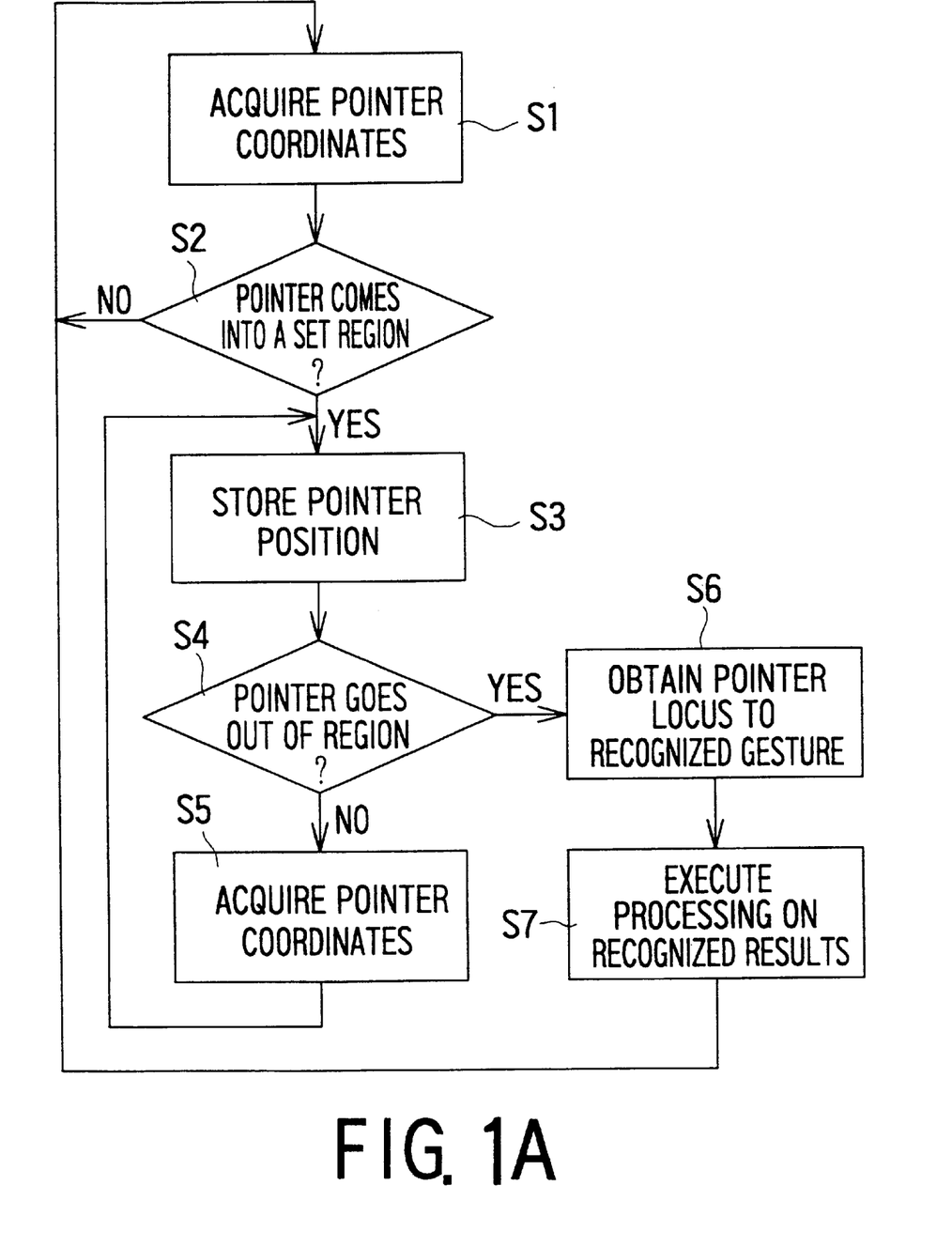
FIG. 1A is a flowchart according to FIG. 1.

The construction thereof will be explained with reference to FIG. 1 and the operation thereof will be explained with reference to FIG. 1A and FIG. 2.

Pointer position inputting means 1 is provided with a function for positioning a pointer 10 at any given position in a picture on the basis of the operator's designation.

As the pointer position inputting means 1, a mouse or a pen input device both so far well known can be used. However, as a suitable example, there is an FPI (finger pointer interface such that when an operator moves this finger, the position and the movement of the operator's finger can be detected to decide the position of the picture pointer 10, as already explained.

A signal indicative of a position of the pointer 10 is given from the pointer position inputting means 10 to a display section 6, so that the display section 6 can display the pointer position. At the same time, the position of the pointer 10 is given from the pointer position inputting means 1 to a pointer position accumulating means 3 (S1, S5). Here, the pointer position accumulating means 3 has such a function as to accumulate a locus 11 of the pointer 10. Further, the accumulation operation of this pointer position accumulating means 3 is controlled on the basis a signal applied by a pointer region pass detecting means 2.

Figure 2:
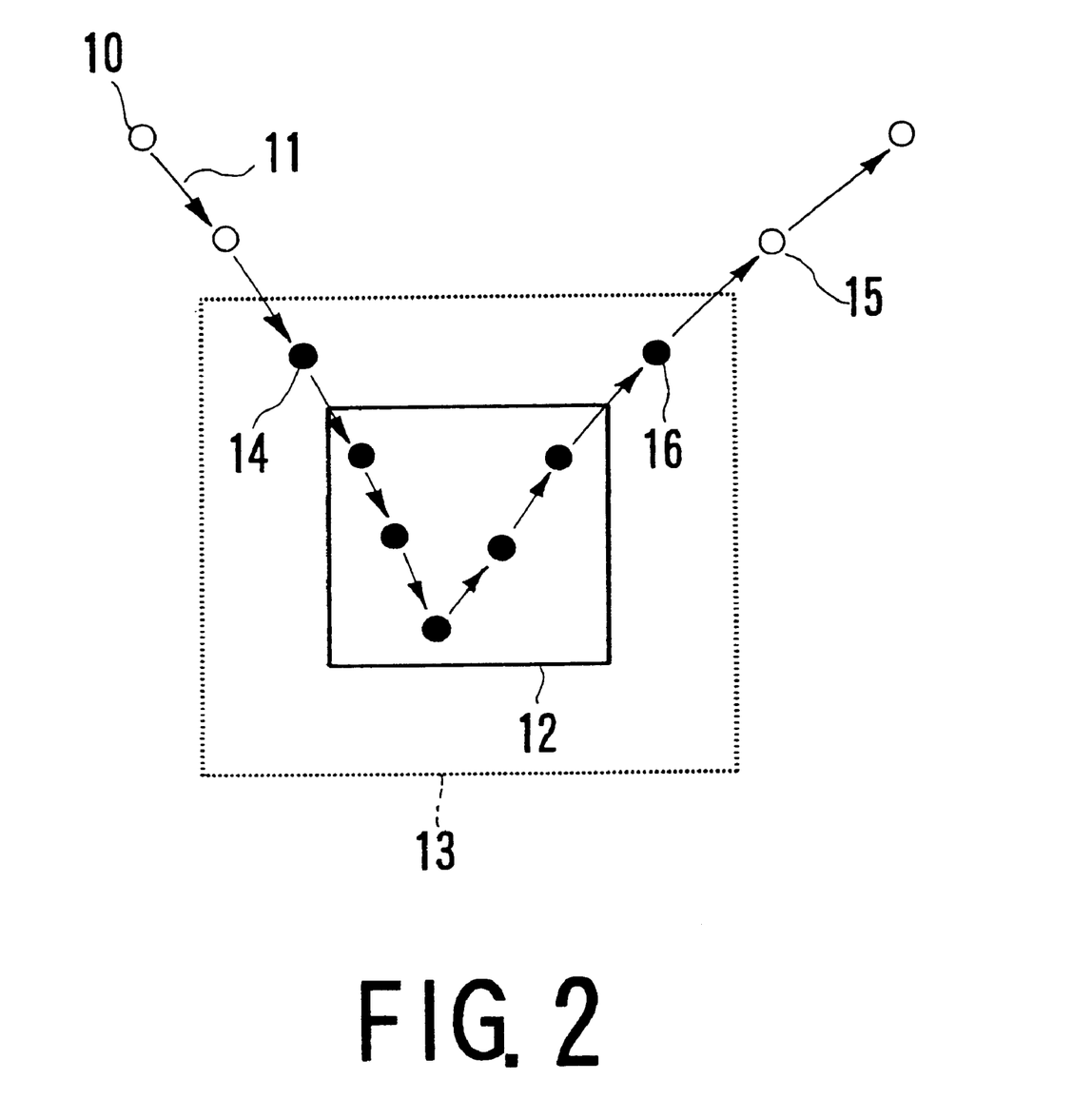
FIG. 2 is an illustration for assistance in explaining the method of detecting a locus of a pointer relative to a specific region in the first embodiment shown in FIG. 1.

On the other hand, as shown in FIG. 2, the pointer region pass detecting means 2 detects the position of the pointer 10 decided by the pointer position inputting means 1 and a contact status of the pointer with a specific region 13 set relative to and around an object 12 in a picture. Therefore, when the pointer 10 passes through a boundary region of the specific region 13, the position of the pointer 10 is detected. Here, the detected data includes data indicative of whether the pointer 10 is in the region 13 or out of the region 13. The detected data are applied to the pointer position accumulating means 3 and a gesture recognizing means 4 (S2,S4).

As a result, the pointer position accumulating means 3 accumulates the positions of the pointer 10 in the region 13 (S3).

The gesture recognizing means 4 discriminates the locus 11 of the pointer 10 on the basis of the outputs of the pointer region pass detecting means 2 and the pointer position accumulating means 3. When a specific gesture related to a significant input operation is recognized, the gesture recognizing means 4 gives its recognition result to a processing section 5 (S6).

When receiving the specific gesture related to a significant input operation from the gesture recognizing means 4, the processing section 5 discriminates the received data as an input operation other than the position data, and applies the data to the display section 6 to execute the processing corresponding to the input operation (S7).

Here, the region 13 is set to a region slightly larger than the area of an object 12 in the picture. Therefore, in the case where the locus 11 of the pointer 10 is drawn as shown in FIG. 2, when the pointer 10 reaches a position 14, the pointer region pass detecting means 2 detects that the pointer 10 comes into the region 13; and when the pointer 10 reaches a position 15, the pointer region pass detecting means 2 detects that the pointer 10 goes out of the region 13 (S2).

On the basis of a signal indicative of that the pointer 10 comes into the region 13, the pointer position accumulating means 3 starts accumulating the positions of the pointer 10. Further, on the basis of a signal indicative of that the pointer 10 goes out of the region 13, the pointer position accumulating means 3 stops accumulating the positions of the pointer 10. Therefore, in the example shown in FIG. 2, the pointer positions as shown by black circles are accumulated from when the pointer 10 reaches the position 14 to when reaches the position 15.

As described above, the time-series change of the accumulated positions of the pointer 10 are read by the gesture recognizing means 4. Further, the gesture recognizing means 4 discriminates whether the obtained gesture of the pointer movement in the region 13 is a significant (or distinctive) movement or not.

For instance, when the movement vector of the pointer position is considered, the vector direction obtained when the pointer 10 comes into the region 13 is opposite to that obtained when goes out of the region 13. On the other hand, when such a locus 11 that the direction thereof changes abruptly is detected in the region 13, this gesture is discriminated as being a "check mark", for instance.

Therefore, when this gesture is discriminated as being some action related to an object 12 existing in the region 13, the data is transmitted to the processing section 5. The processing section 5 executes a specific input operation related to the corresponding object 12. For instance, when this gesture corresponds to an opening of a desired file, the file designated by the object 12 can be opened.

Of course, although the position of the pointer 10 is displayed in the picture, the display section 6 can displays an appropriate feedbacked result obtained on the basis of the gesture recognition, for instance such as the positional relationship between the pointer 10 and the region 13 (i.e., as to whether the pointer 10 is in or out of the region 13).

As the pointer position inputting means 1, as already explained, it is possible to use various conventional input devices such a mouse, track ball, pen-input tablet, etc. or a space mouse, without being limited only to the FPI utilizing the movement of the operator's finger. However, when the space mouse which requires another operation button is used, it is possible to obtain a remarkable effect, in the same way as with the case of the FPI.

Now, the pointer region pass detecting means 2 detects the contact status between the pointer 10 and the region 13 previously determined in a picture. Here, however, various methods of detecting the contact status can be considered. For instance, as already explained, it is possible to detect whether the pointer 10 is in the region 13 or not, instead of detecting whether the pointer 10 comes into or goes out of the region 13.

Further, here, the region 13 defined herein is not limited only to a rectangular region. That is, a region represented by a circle, triangle, another shape, etc. or a region specified by lines, dots, etc. can be used. In other words, as far as lines or dots are set in specific positional relationship with respect to an object 12, the gesture can be discriminated by detecting the way of movement of the pointer 10 relative to the lines or dots.

Figure 2A:
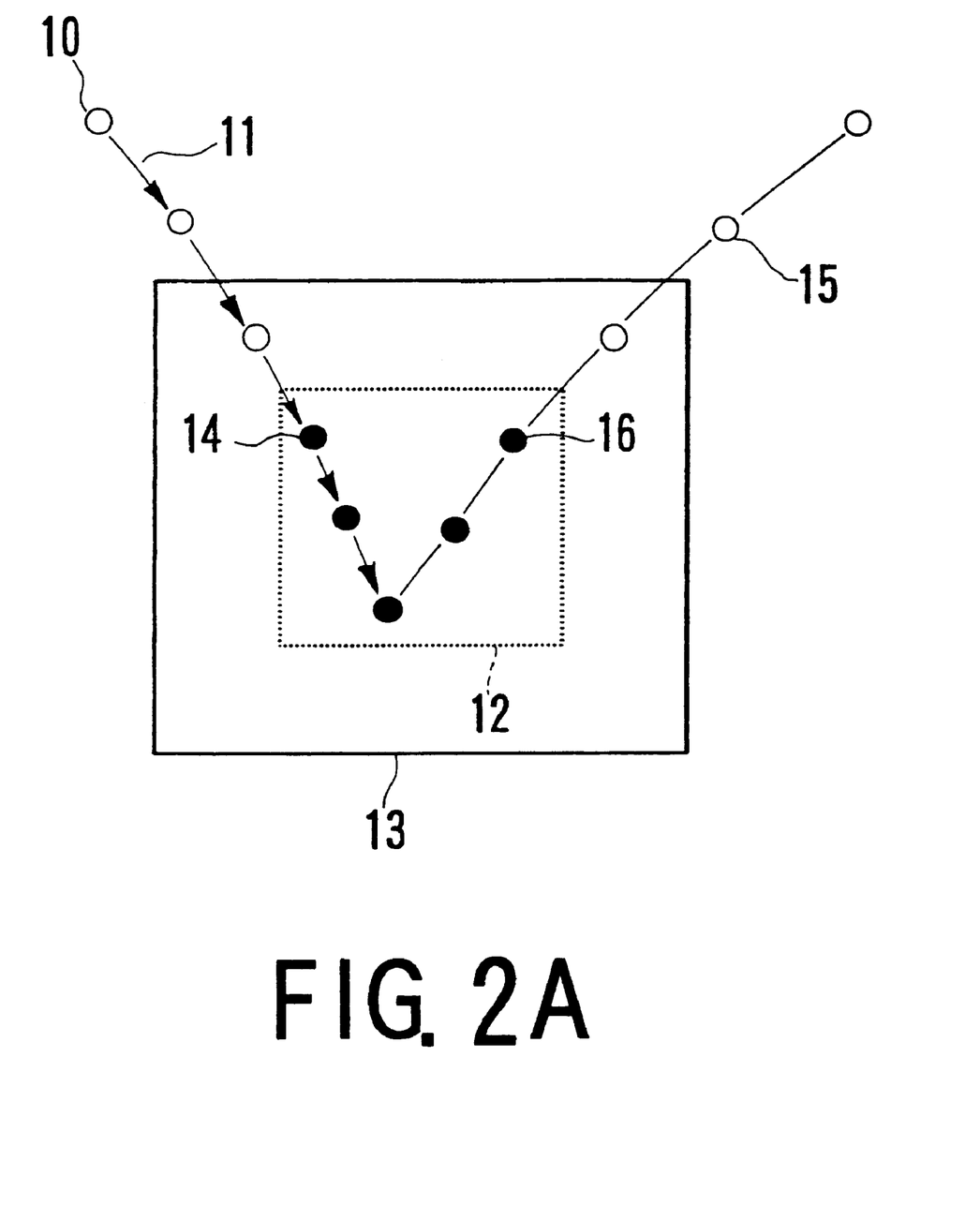
FIG. 2A is another illustration for assistance in explaining the method of detecting a locus of a pointer relative to a specific region in the first embodiment shown in FIG. 1.
Figure 2B:
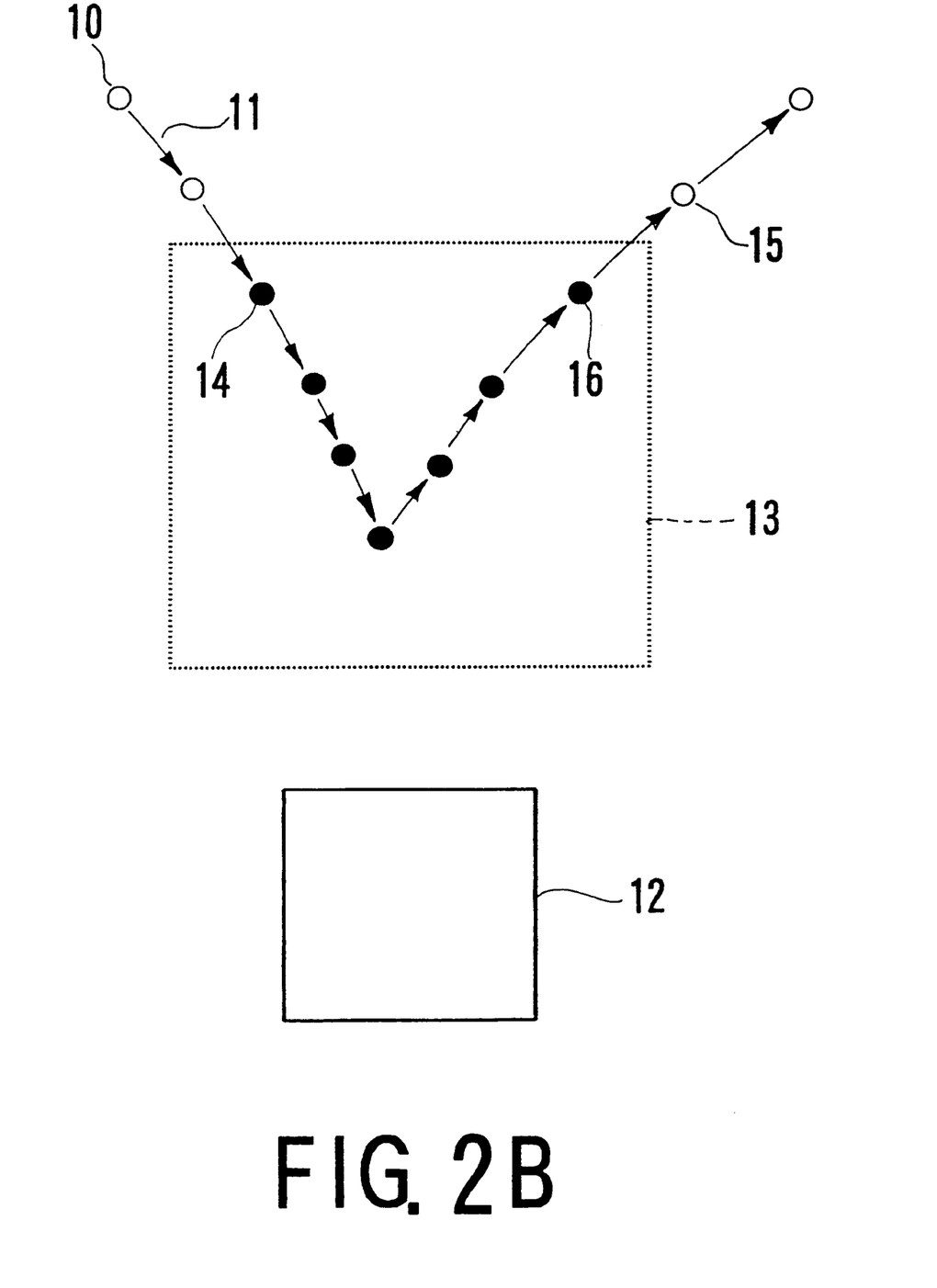
FIG. 2B is the other illustration for assistance in explaining the method of detecting a locus of a pointer relative to a specific region in the first embodiment shown in FIG. 1.

Further, in the above-mentioned embodiment, although the region 13 is determined as an area larger than that of the object 12, the region 13 can be determined by a region smaller than the object 12, as shown in FIG. 2A. Further, the region 13 is not necessarily overlapped with the object 12, as shown in FIG. 2B. In other words, as far as the specific positional relationship between the region 13 and the object 12 can be previously known, the operator can performs a significant input operation related to the object 12 to the region 13.

Further, in the above-mentioned embodiment, the pointer position accumulating means 3 operates in such a way that several point positions of the pointer 10 are stored on the basis of the region pass data obtained by the pointer region pass detecting means 2, and further the accumulated data are outputted to the gesture recognizing means 4. However, in order to control the pointer position accumulating means 3, it is not necessarily required to use the region pass data obtained by the pointer region pass detecting means. For instance, it is possible to discriminate the gesture as follows: several points of the past locus of the pointer 10 are always recorded or accumulated in the pointer position accumulating means 3. Further, when the a signal indicative of a pass through the region is given from the pointer region pass detecting means 2 to the gesture recognizing means 4, the gesture recognizing means 4 reads the accumulated data from the pointer position accumulating 3, to discriminate the gesture.

Figure 3:
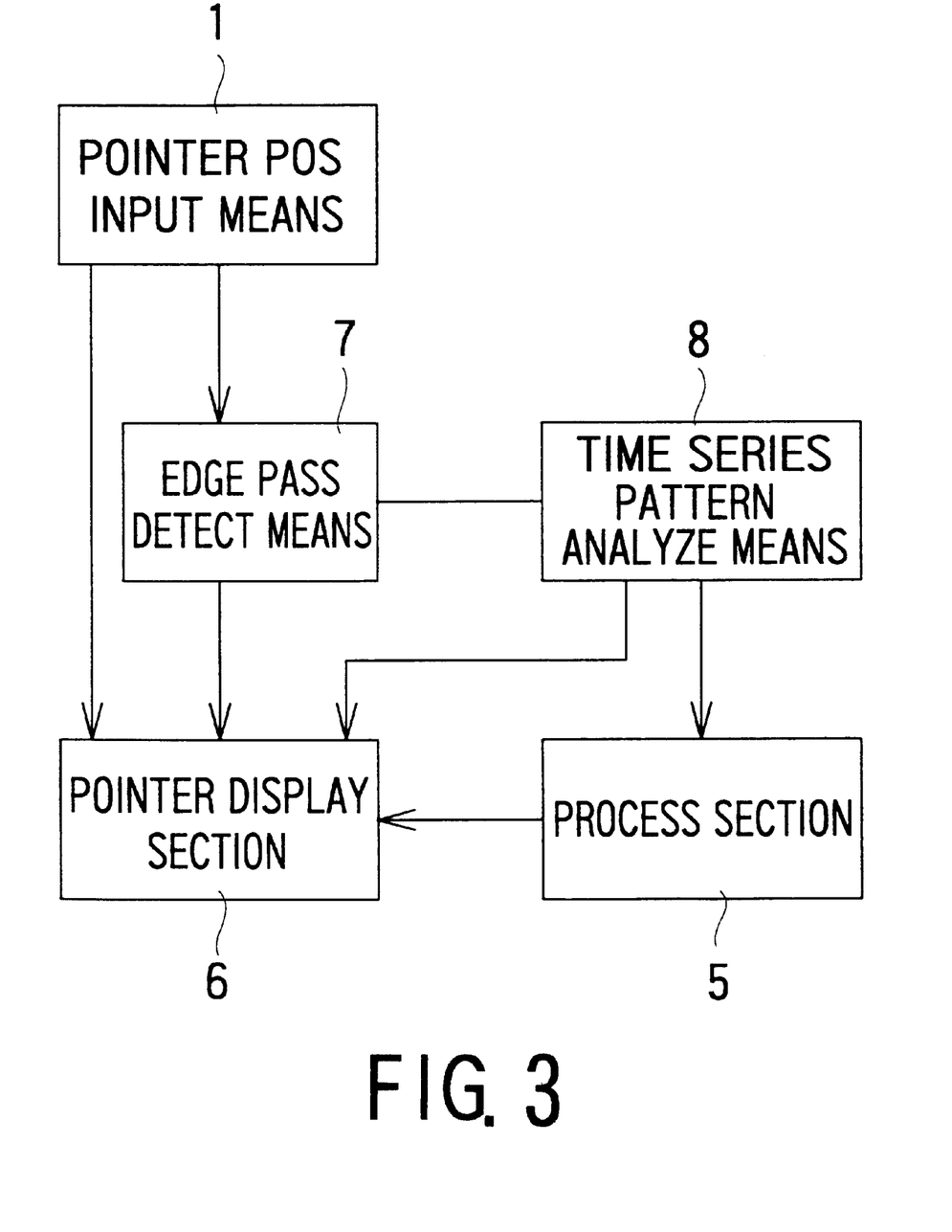
FIG. 3 is a block diagram showing a second embodiment of the data input device according to the present invention.
Figure 3A:
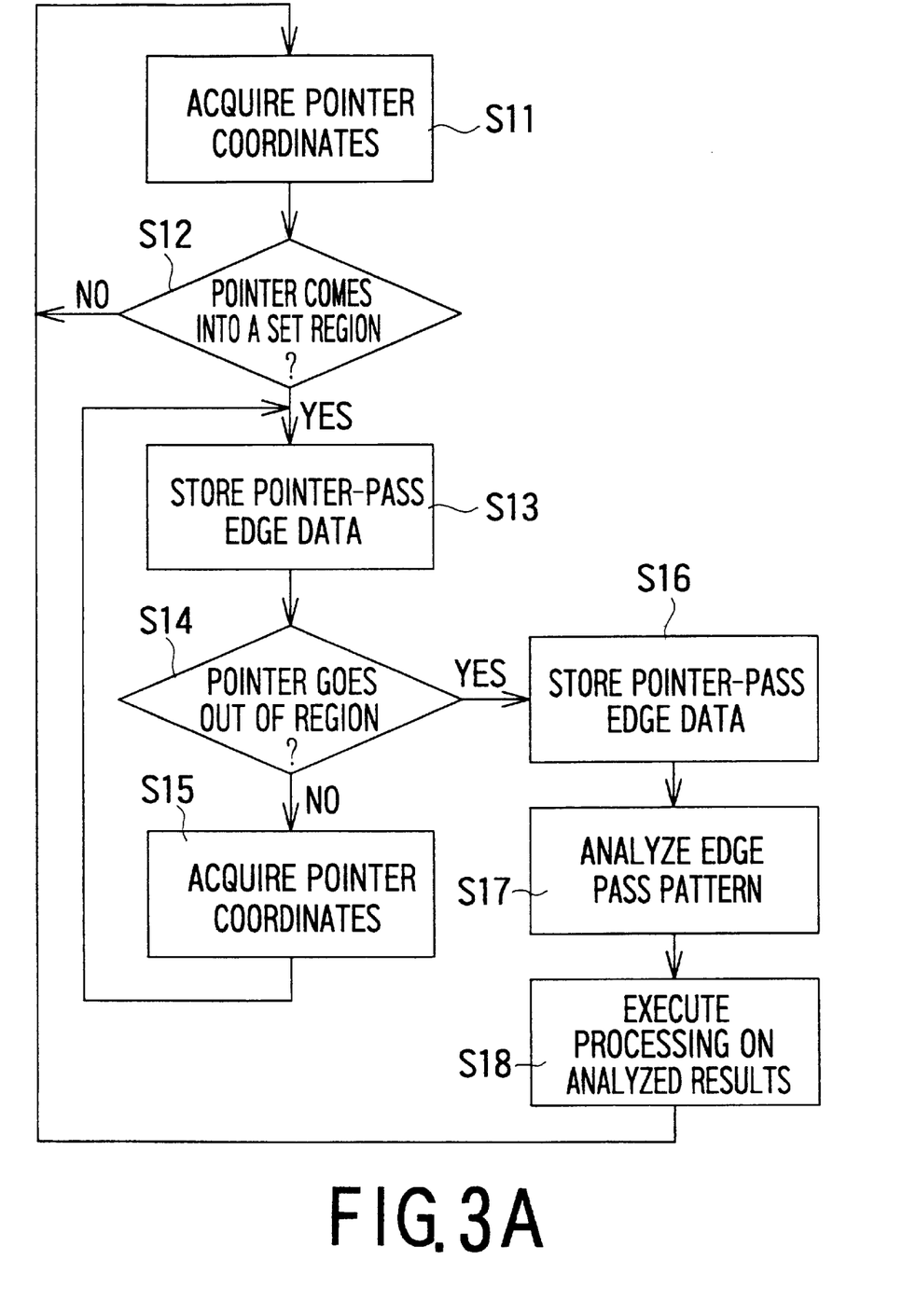
FIG. 3A is a flowchart according to FIG. 3.

FIG. 3 is a block diagram showing a second embodiment of the data input device according to the present invention.

The construction thereof will be explained with reference to FIG. 3 and the operation thereof will be explained with reference to FIG. 4.

Figure 4:
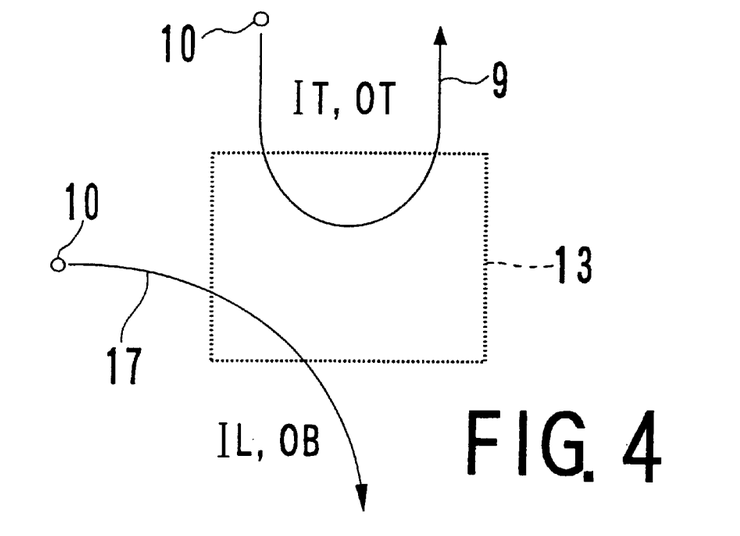
FIG. 4 is an illustration for assistance in explaining the method of detecting a locus of a pointer relative to a specific region in the second embodiment shown in FIG. 3.

In this second embodiment, as shown in FIG. 4, a region 13 related to an object is set in a picture, and a specific input operation other than the position data can be inputted and designated on the basis of the positional relationship between the region 13 and the movement of the pointer 10.

In this second embodiment, the region 13 set in the picture is enclosed by at least one side, that is, by an edge. Further, the content (i.e., meaning or sort) of the specific significant input operation can be discriminated on the basis of data indicative of through which edge and in which direction the pointer 10 has passed, irrespective of the presence of the pointer 10 inside or outside the region 13.

In FIG. 3, an edge pass detecting means 7 detects whether the pointer 10 has passed through an edge of the region 13, and further gives data indicative of the edge through which and the direction in which the pointer 10 has passed, to a time series pattern analyzing means 8 (S11–S16).

Here, since region edge data are previously registered in the edge pass detecting means 7, the edge pass detecting means 7 can detect the pass edge and pass direction of the pointer 10 with reference to these registered region edge data. Therefore, when the region 13 is a polygon other than a rectangle, although the region 13 has a number of edges corresponding to the shape of the polygon, in this case, the pass edge and the pass direction of the pointer can be detected on the basis of the registered data of the polygon.

Further, when a circular or an oval shape is set as the region 13, the line is divided into a plurality of curved segments, and further the divided curved segments are assumed as the polygonal edges. In this case, when the curved segments of the circular or the oval are fitted to a polygon of roughly the same size thereof, these curved segments can be considered as the edges thereof.

Further, instead of allocating one side to one edge in the polygonal region 13, it is also possible to regard a plurality of sides together as one edge, or conversely to allocate a plurality of edges to one side. That is, the data registered in the edge pass detecting means 7 can be determined freely.

Here, when the region 13 is of rectangular shape as shown in FIG. 4, four edges can be allocated to four sides, respectively.

Figure 5:
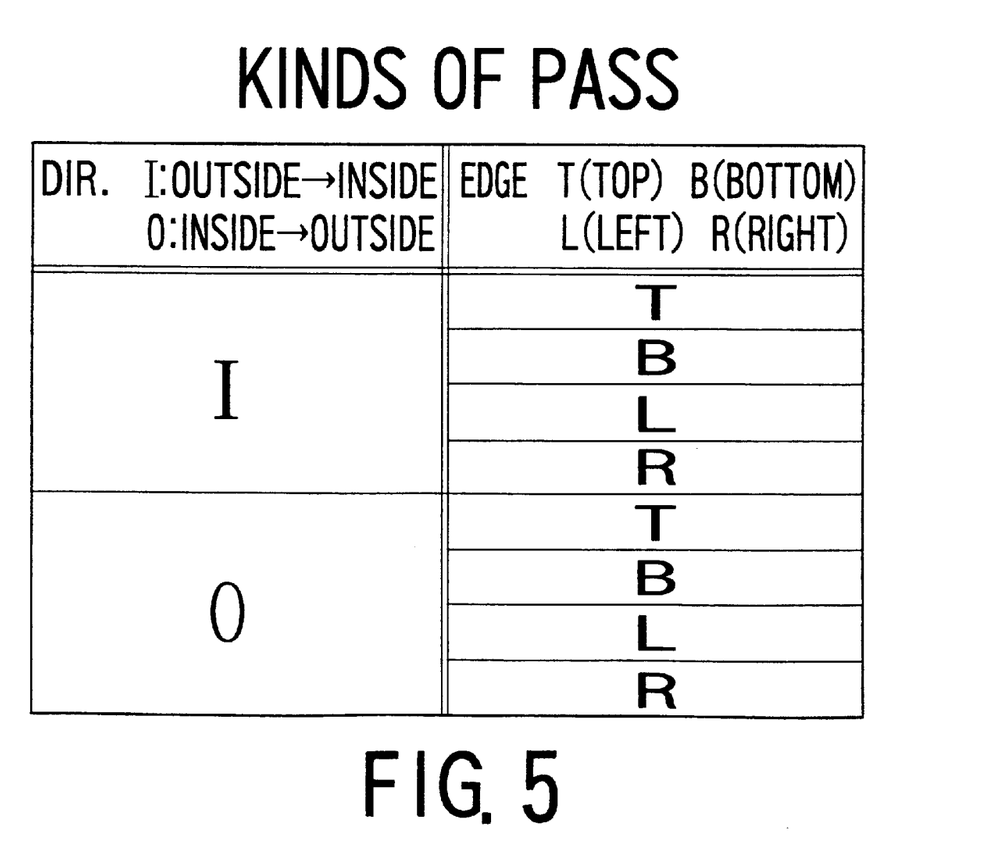
FIG. 5 is a table listing the combinations of the pointer loci relative to the specific region in the second embodiment shown in FIG. 3.

Now, when the pointer comes in or out of the region 13, the locus of the pointer 10 has various positional relationship relative to the four edges. For instance, as listed in a table shown in FIG. 5, when the four edges of the region 13 is denoted by four edges of a top edge T, a right edge R, a left edge L and a bottom edge B, respectively, there exist two cases where the pointer 10 comes into the region (denoted by I) and goes out of the region (denoted by O) for each of the four edges of T, B, L and R. In other words, when the pointer 10 comes into the region 13 from the outside to the inside, it is possible to obtain four kinds according to the edges T, B, L and R. In the same way, when the pointer 10 goes out of the region 13 from the inside to the outside, it is possible to obtain four kinds according to the edges T, B, L and R. Therefore, when the pointer 10 comes into and then goes out of the region 13, since the pointer 10 passes always through two edges, it is possible to obtain significant passes of 16 kinds in total on the basis of the pass edges and directions of the pointer 10.

For instance, as shown in FIG. 4, when the pointer 10 comes into the region 13 through the edge T and then goes out the region 13 through the edge T along a locus as shown by 9, this pointer 10 motion can be represented by [IT, OT], and when the pointer 10 comes into the region 13 through the edge L and then goes out of the region 13 through the edge B along a locus as shown by 17, this pointer 10 motion can be represented by [IL, OB].

The time series pattern analyzing means 8 excludes simple patterns from the time series patterns related to the above-mentioned pass data, and allocates only a significant pass data to a specific input operation (17).

For instance, in order to allocate a selection and opening of a document to an object representing the same document, [IT, OT] is allocated to a region 13 corresponding to the object.

Figure 6:
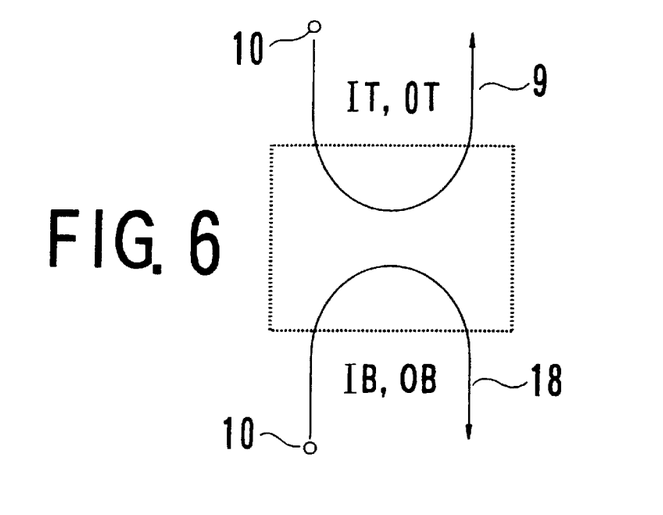
FIG. 6 is an illustration for assistance in explaining the method of allocating the pointer loci to the specific region in the second embodiment shown in FIG. 3.

That is, in the case as shown in FIG. 6, [IT, OT] represents a pointer motion such that the pointer 10 comes into the region 13 from above and then goes out of the same region 13 from above along the locus 9. In correspondence to this movement of the pointer 10, the time series pattern analyzing means 8 transmits an analysis result corresponding to the file open operation to the processing section 5. Therefore, the processing section 5 executes the opening of the file corresponding to the object (S18).

Further, in order to allocate an operation for selecting and dragging to an object, [IB, OB] is allocated to a region 13 corresponding to the object.

That is, in the case as shown in FIG. 6, [IB, OB] represents a pointer motion such that the pointer 10 comes into the region 13 from below and then goes out the same region 13 from below along the locus 18. In correspondence to the movement of the pointer 10, the time series pattern analyzing means 8 transmits an analysis result corresponding to the drag operation to the processing section 5. Therefore, the processing section 5 executes the drag of the object in correspondence to the succeeding movement of the pointer 10.

Here, the reason why the simple movement of the pointer 10 is excluded and only a complicated movement of the pointer is allocated to the specific input operation will be described hereinbelow.

For instance, in the case where the input operation related to the object is so set as to be detected, even if the pointer 10 passes simply through the region 13 related to an object, whenever the operator moves the pointer 10 simply, the operator must move the pointer 10 in such a way that the pointer 10 will not pass through the region 13. This input operation is troublesome for the operator and thereby an undesired burden is applied to the operator. In addition, there exists such a high possibility that an erroneous operation not intended by the operator may occur, according to circumstances.

For the above-mentioned reasons, the time series pattern analyzing means 8 excludes the simple movements of the pointer 10 (e.g., the simple pass of the pointer in the vertical, horizontal or oblique direction) from the specific significant input operation. In other words, in the case of the locus 17 as shown in FIG. 4, since this movement of the pointer 10 is relatively simple, this pointer movement is regarded as being a simple pass of the pointer 10, so that the time series pattern analyzing means 8 disregards this pointer movement, without reacting thereto.

Further, in this embodiment, although the case where a plurality of significant input operations are allocated to a plurality of loci, it is possible to allow all the significant movements of the pointer 10 to have the same significant input operation. In more detail, when [IT, OT], [IB, OB], [IL, OL] AND [IR, OR] are detected, these are all allocated always to open a file.

On the other hand, it is also possible to consider to allocate a different significant input operation for each direction of the pointer movement. In other words, the vertical pointer motions such as [IT, OT] and [IB, OB] are allocated to the opening of a file, and the horizontal pointer motions such as [IL, OL] and [IR, OR] are allocated to the drag of an object.

Figure 7A:
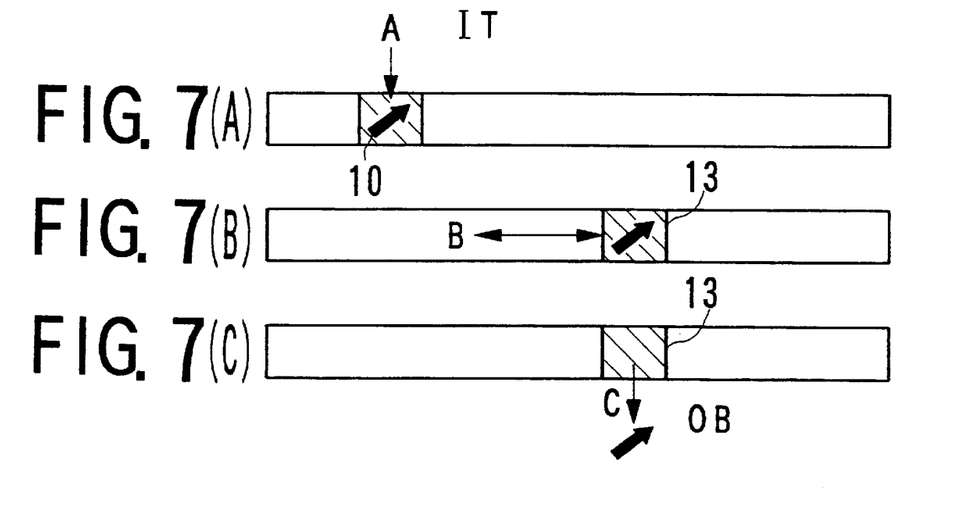

FIGS. 7(A) to 7(C) are illustrations for showing the case where sliders are used to input an intensity or quantity such as sound volume, display brightness, parameter setting, etc.

In the case shown in FIG. 7(A), when the pointer 10 is moved to an object indicative of the current slider position (i.e., a region 13 is overlapped with an object at the current position) from above as shown by an arrow A, this corresponds to [IT] operation. Further, in this case, the area of an object is set to the same size of that of the region 13 for detecting the object.

Figure 7D:
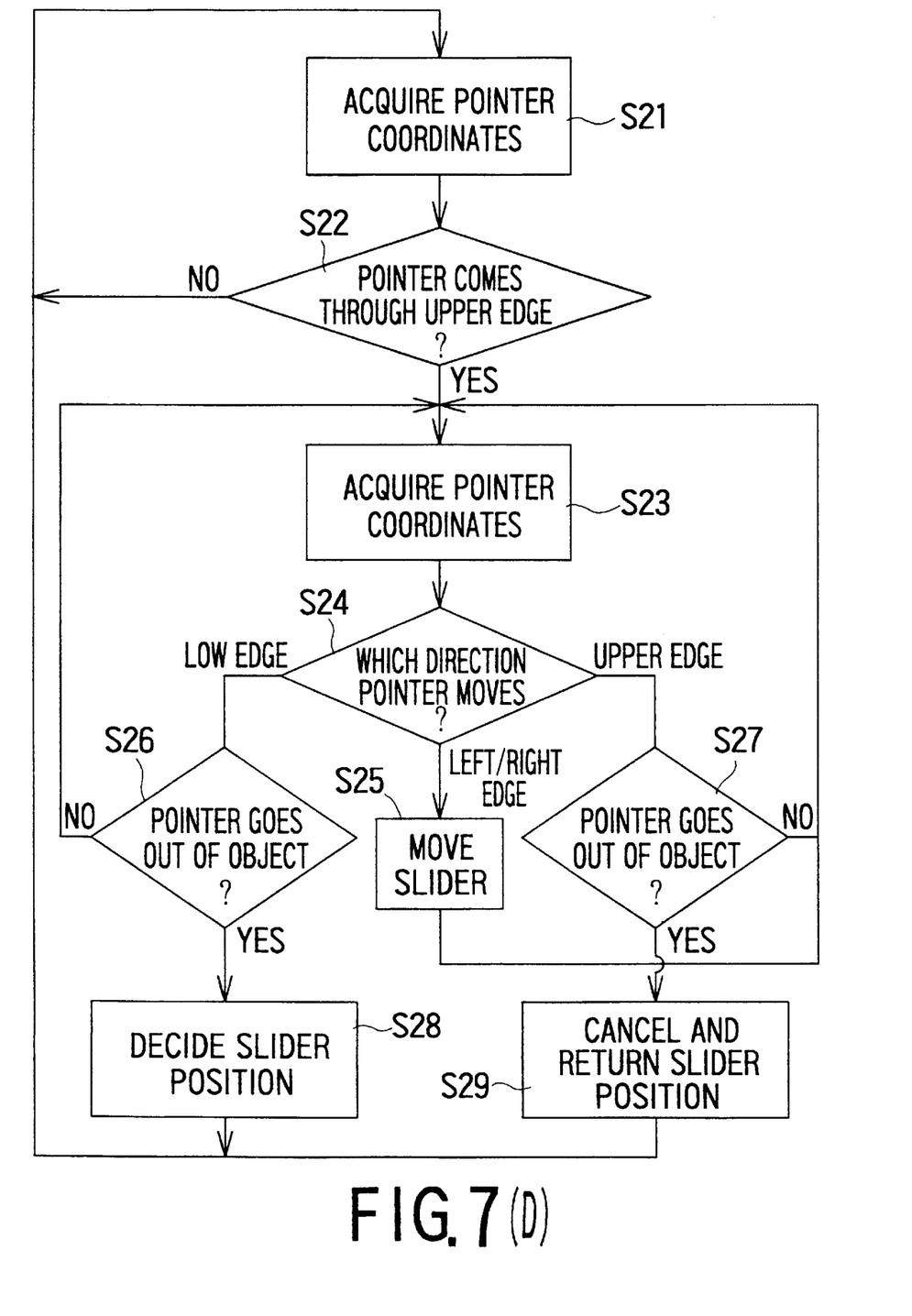
FIG. 7(D) is a flowchart according to FIGS. 7(A) to 7(C).

As a result, the edge pass detecting means 7 shown in FIG. 3 detects that the pointer 10 comes into the region 13 from above, and transmits this operation to the processing section 5 via the time series pattern analyzing means 8, to activate the slider (S21–S24).

After that, as shown in FIG. 7(B), when the slider is moved right and left by the pointer 10 as shown by an arrow B, it is possible to select the operation of any desired intensity or quantity (S25).

When the slider is moved to the desired position, as shown in FIG. 7(C), the pointer 10 is taken out of the region 13 from the lower edge in an arrow direction C, which corresponds to [OB] operation (S26). As a result, the locus of the pointer 10 is detected by the edge pass detecting means 7, and transmitted to the processing section 5 via the time series pattern analyzing means 8, to decide the slider position; that is, to end the input operation of the intensity or quantity (S28).

Further, when the pointer 10 is taken out of the region from the upper edge, instead of taking out of the region from the lower edge, it is possible to cancel the movement of the slider and to reset the operation to the status before the slider is moved (S27,S29). Here, a control program for activating the edge pass detecting means 7, the time series pattern analyzing means 8, and the processing section 5 can decide a significant input operation to each movement of the pointer 10 relative to the region 13, so that any desired significant operation can be set freely.

Now, when the pointer 10 is controlled on the basis of the finger motion; that is, by moving the finger right and left, if the finger motion is dislocated from the region 13 in the upward and downward direction, the pointer 10 is moved beyond the upper and lower edges of the region 13. In this case, the slider is moved against the operator's will in such a way that the intensity or quantity is decided to a value not intended by the operator or that the movement of the slider is canceled. When the pointer is slightly dislocated from the region in particular, since the pointer control is disabled, this is very inconvenient for the operator in use. To overcome this problem, it is preferable to execute the following processing.

First, once the pointer 10 is put in an object at the current position from the upper edge of the region 13, with respect to the succeeding movement of the pointer 10, only the horizontal movement for selecting the intensity or quantity is quantized. In more detail, when the movement direction of the pointer 10 lies within a predetermined range in the vertical direction, the object is moved by a value corresponding to only the horizontal movement of the pointer (obtained by projecting the pointer movement onto a the horizontal direction), and thereby the pointer 10 is moved in the same way only in the horizontal direction. That is, as far as the movement direction of the pointer 10 lies within a predetermined range in the vertical direction, the pointer is moved in the horizontal direction. Further, when the pointer movement stops, the vertical stroke of the pointer 10 is first detected. After that, when the pointer is passed through the upper and lower edges of the region 13, the decision of intensity or quantity or the movement of the slider is canceled. On the basis of the above-mentioned operation, it is possible to improve the operability of the slider markedly.

Further, it is possible to obtain the same effect as above, by detecting the tendency of the horizontal movement of the pointer 10 during the slider operation and by widening the vertical range of the region 13 when the pointer 10 comes into the region 13 due to the slide operation, without switching the control mode. In this case, it is possible to prevent the pointer from being dislocated from the region 13 easily, after the pointer has been set in the region 13.

Further, although various input operations can be considered other than the slider operation, for instance such as color election, menu bar selection, etc., in any cases, it is possible to execute an input operation other than the position data, by registering the significant movement of the pointer relative to a region set in relation to an object, in a memory in connection with the operation.

As described above, in the data input device according to the present invention, a significant movement of the pointer can be extracted on the basis of the movement of the pointer in the region arranged in correspondence to an object or on the basis of a combination of the incoming and outgoing directions of the pointer relative to the region. Further, a specific significant input operation (or instruction) other than the position data can be given to the electronic apparatus on the basis of the extracted data. Therefore, it is possible to input a significant operation corresponding to an object, without use of special inputting means such as a mouse, so that the operability of the electronic apparatus can be improved markedly.

What is claimed is:

1. A data inputting device, comprising;
    pointer position inputting means for causing a computer to input position data of a pointer displayed on a screen;
    pointer position accumulating means for causing the computer to accumulate the pointer position data applied by said pointer position inputting means;
    pointer region pass detecting means for causing the computer to control start and stop operations of said pointer position accumulating means, and for causing said pointer position accumulating means to execute the position accumulation operation only when the pointer position data satisfies a predetermined relationship with respect to a predetermined region defined in association with an object on the screen;
    gesture recognizing means for causing the computer to discriminate whether a pointer locus represented by the pointer position data applied by said pointer position accumulating means is a predetermined gesture or not; and
    a processing section for causing a computer to execute an operation related to the object in association with the pointer locus, whenever said gesture recognizing means recognizes the pointer locus as a predetermined gesture.

2. The data inputting device of claim 1, wherein the predetermined region is decided to be larger than the object so as to include the object within the predetermined region.

3. The data inputting device of claim 1, wherein the predetermined region is decided to be smaller than the object so as to be included within the object.

4. The data inputting device of claim 1, wherein the predetermined region is decided in association with and in the vicinity of the object.

5. A data inputting device, comprising:
    pointer position inputting means for causing a computer to input position data of a pointer displayed on a screen;
    pointer position accumulating means for causing the computer to accumulate the pointer position data applied by said pointer position inputting means;
    pointer region pass detecting means for causing the computer to control start and stop operations of said pointer position accumulating means, for causing said pointer position accumulating means to start the position accumulation operation whenever the pointer position enters a predetermined region defined in association with an object on the screen, and for causing said pointer position accumulating means to stop the position accumulation operation whenever the pointer position exits the same predetermined region;
    gesture recognizing means for causing the computer to discriminate whether a pointer locus represented by the pointer position data applied by said pointer position accumulating means is a predetermined gesture or not; and
    a processing section for causing the computer to execute an operation related to the object in association with the pointer locus as a predetermined gesture.

6. The data inputting device of claim 5, wherein the predetermined region is decided to be larger than the object so as to include the object within the predetermined region.

7. The data inputting device of claim 5, wherein the predetermined region is decided to be smaller than the object so as to be included within the object.

8. The data inputting device of claim 5, wherein the predetermined region is decided in association with and in the vicinity of the object.

9. A data inputting device, comprising:

pointer position inputting means for causing a computer to input position data of a pointer displayed on a screen;

edge pass detecting means for causing the computer to detect one or a plurality of boundary edge lines passed across by the pointer and to detect a direction or directions in which the pointer passes across one or a plurality of boundary edge lines displayed on the screen;

time series pattern analyzing means for causing the computer to obtain a command by analyzing one or a plurality of signals applied by said edge pass detecting means in time series manner; and a processing section for causing the computer to execute an operation according to the command obtained by said time series pattern analyzing means.

10. The data inputting device of claim 9, wherein the boundary edge lines are respective sides of a polygon.

11. The data inputting device of claim 10, wherein the respective sides of the polygon are divided into one or a plurality of boundary edge lines.

12. The data inputting device of claim 9, wherein a circle or an oval is divided into a plurality of boundary edge lines.

13. The data inputting device of claim 9, wherein said time series pattern analyzing means is so constructed as not to cause the computer to be activated when the pointer passes across the boundary edge line in a predetermined simple crossing motion.

14. The data inputting device of claim 9, wherein a closed space is formed by the boundary edge lines so as to function as a slider in such a way that the slider is movable together with the pointer when the pointer comes into the closed space through a boundary edge line but held at its position when the pointer goes out of the closed space outside through another boundary edge line.

15. A method of inputting data, comprising the steps of:

causing a computer to input position data of a pointer displayed on a screen, by use of pointer position inputting means;

causing the computer to accumulate the pointer position data applied by the pointer position inputting means, by use of pointer position accumulating means;

causing the computer to discriminate whether a pointer locus represented by the pointer position data applied by the pointer position accumulating means is a predetermined gesture or not, by use of gesture recognizing means;

causing the computer to execute an operation related to an object in association with the pointer locus, whenever the gesture recognizing means recognizes the pointer locus as a predetermined gesture, by use of a processing section; and causing the computer to control start and stop operations of said pointer position accumulating means, and causing said pointer position accumulating means to execute the position accumulation operation only when the pointer position data satisfies a predetermined relationship with respect to a predetermined region defined in association with the object, by use of pointer region pass detecting means.

16. A method of inputting data, comprising the steps of:

causing a computer to input position data of a pointer displayed on a screen, by use of pointer position inputting means;

causing the computer to detect one or a plurality of boundary edge lines passed across by the pointer and to detect a direction or directions in which the pointer passes across one or a plurality of boundary edge lines displayed on the picture, by use of edge pass detecting means;

causing the computer to obtain a command by analyzing one or a plurality of signals applied by the edge pass detecting means in time series manner, by use of time series pattern analyzing means; and causing the computer to execute an operation according to the command obtained by the time series pattern analyzing means, by use of a processing section.

17. The method of inputting data of claim 16, wherein a closed space is formed by the boundary edge lines so as to function as a slider in such a way that the slider is movable together with the pointer when the pointer comes into the closed space through a boundary edge line but held at its position when the pointer goes out of the closed space outside through another boundary edge line.

18. A computer-readable memory, comprising:

pointer position inputting means for causing a computer to input position data of a pointer displayed on a screen;

pointer position accumulating means for causing the computer to accumulate the pointer position data applied by said pointer position inputting means;

pointer region pass detecting means for causing the computer to control start or stop operations of said pointer position accumulating means, and for causing said pointer position accumulating means to execute the position accumulation operation only when the pointer position data satisfies a predetermined relationship with respect to a predetermined region defined in association with an object;

gesture recognizing means for causing the computer to discriminate whether a pointer locus represented by the pointer position data applied by said pointer position accumulating means is a predetermined gesture or not; and a processing section for causing the computer to execute an operation related to an object in association with the pointer locus, whenever said gesture recognizing means recognizes the pointer locus as a predetermined gesture.

19. A computer-readable memory, comprising:

pointer position inputting means for causing a computer to input position data of a pointer displayed on a screen;

edge pass detecting means for causing the computer to detect one of a plurality of boundary edge lines passed across by the pointer and to detect a direction of directions in which the pointer passes across one or a plurality of boundary edge lines displayed on the screen;

time series pattern analyzing means for causing the computer to obtain a command by analyzing one or a plurality of signals applied by said edge pass detecting means in time series manner; and a processing section for causing the computer to execute an operation according to the command obtained by said time series pattern analyzing means.

\* \* \* \* \*